(12) United States Patent
Goldstein et al.

(10) Patent No.: US 8,690,064 B2
(45) Date of Patent: Apr. 8, 2014

(54) TRANSACTION CARD ASSEMBLY AND METHODS OF MANUFACTURE

(75) Inventors: Keith E. Goldstein, Framingham, MA (US); Ronald A. Cageao, Beaver, PA (US)

(73) Assignee: Abnote USA, Inc., Boston, MA (US)

( * ) Notice: Subject to any disclaimer, the term of this patent is extended or adjusted under 35 U.S.C. 154(b) by 652 days.

(21) Appl. No.: 12/433,043

(22) Filed: Apr. 30, 2009

(65) Prior Publication Data

US 2010/0276495 A1    Nov. 4, 2010

(51) Int. Cl.
*G06K 19/06* (2006.01)

(52) U.S. Cl.
USPC .......................................... 235/492; 235/487

(58) Field of Classification Search
USPC .......... 235/492, 487; 257/678, 679, 684, 687, 257/713
See application file for complete search history.

(56) References Cited

U.S. PATENT DOCUMENTS

| | | | |
|---|---|---|---|
| 4,450,024 A | | 5/1984 | Haghiri-Tehrani |
| 5,009,311 A | * | 4/1991 | Schenk .................. 206/706 |
| 5,134,773 A | | 8/1992 | LeMaire et al. |
| 5,350,553 A | | 9/1994 | Glaser et al. |
| 5,399,847 A | | 3/1995 | Droz |
| 5,417,905 A | | 5/1995 | Lemaire et al. |
| 5,520,863 A | * | 5/1996 | Ochi et al. .................. 264/46.5 |
| 5,567,362 A | | 10/1996 | Gr un |
| 5,598,032 A | | 1/1997 | Fidalgo |
| 5,741,392 A | | 4/1998 | Droz |
| 5,817,207 A | | 10/1998 | Leighton |
| 5,955,021 A | | 9/1999 | Tiffany, III |
| 6,025,054 A | | 2/2000 | Tiffany, III |
| 6,036,099 A | | 3/2000 | Leighton |
| 6,208,019 B1 | | 3/2001 | Tane et al. |
| 6,214,155 B1 | | 4/2001 | Leighton |
| 6,256,873 B1 | | 7/2001 | Tiffany, III |
| 6,305,609 B1 | | 10/2001 | Melzer et al. |
| 6,441,736 B1 | | 8/2002 | Leighton |
| 6,514,367 B1 | | 2/2003 | Leighton |

(Continued)

FOREIGN PATENT DOCUMENTS

| EP | 0350179 A1 | 1/1990 |
|---|---|---|
| EP | 0989513 A2 | 3/2000 |

OTHER PUBLICATIONS

Bicerano et al., Polymer Foams Mechanisms and Materials, 2004, CRC Press LLC, Chapter 6, pp. 1-79.*

(Continued)

*Primary Examiner* — Michael G Lee
*Assistant Examiner* — Tabitha Chedekel
(74) *Attorney, Agent, or Firm* — Kriegsman & Kriegsman

(57) ABSTRACT

A transaction card assembly may be constructed and arranged for use in a transaction by an issuee of the transaction card assembly. The transaction card assembly may include a first layer including a sheet of material, a second layer including a sheet of material, and an adhesive foam material between the first and second layers that expands to fill a space between the first and second layers and to define, at least in part, a finished thickness for the transaction card assembly and bonds the first and second layers together. Indicia, such as information representing an account number, biometric data representing a feature of the issuee, etc., may be included with the assembly for use in a transaction.

36 Claims, 3 Drawing Sheets

(56) References Cited

U.S. PATENT DOCUMENTS

| | | |
|---|---|---|
| 6,557,766 B1 | 5/2003 | Leighton |
| 6,575,371 B1 | 6/2003 | Hoppe et al. |
| 6,586,078 B2 | 7/2003 | Smulson |
| 6,923,378 B2 | 8/2005 | Jones et al. |
| 6,991,262 B1 * | 1/2006 | Ragner ............................ 285/7 |
| 6,994,262 B1 * | 2/2006 | Warther ........................ 235/492 |
| 7,008,500 B2 | 3/2006 | Smulson |
| 2003/0150919 A1 * | 8/2003 | Blank ........................... 235/487 |
| 2006/0210785 A1 * | 9/2006 | Takada et al. ............. 428/304.4 |

OTHER PUBLICATIONS

Ulrich, Encyclopedia of Polymer Science and Technology, Oct. 22, 2001, John Wiley & Sons, Inc., vol. 4, pp. 1-47.*
Bicerano et al., Polymer Foams Mechanisms and Materials, 2004 CRC Press LLC, Chapter 6, pp. 1-79.*
Grunbauer et al. Polymer Foams Mechanisms and Materials, 2004, CRC Press LLC, Chapter 7, pp. 1-58.*
Ulrich, Encyclopedia of Polyer Science and Technology, Oct. 22, 2001, John Wiley & Sons, Inc., vol. 4, pp. 1-47.*

* cited by examiner

TRANSACTION CARD ASSEMBLY AND METHODS OF MANUFACTURE

BACKGROUND

Transaction cards, such as credit and debit cards, gift cards, loyalty cards, telephone cards, access cards, bankcards, membership cards, promotional cards, e.g., frequent flyer cards, identification cards and the like, are widely used. Such transaction cards may include a variety of different indicia to identify the card, the individual using the card, an associated transaction account, such as a credit card, gift card or telephone calling card account, and/or other features so that the indicia is usable in a transaction regarding the card. The indicia may include a string of printed alphanumeric characters, a bar code, an encoded magnetic strip attached to the card, an RFID tag, an embossing, a hologram or other security feature, printed logos, and so on.

SUMMARY OF INVENTION

In one aspect of the invention, a transaction card assembly is provided which is constructed and arranged for use in a transaction by an issuee of the transaction card assembly. The issuee of the transaction card assembly may purchase the assembly, receive the assembly as a gift, be given the assembly by a governmental agency, or otherwise be issued the assembly. The transaction card assembly may include a first layer including a sheet of material, a second layer including a sheet of material, and an adhesive foam material between the first and second layers that expands to fill a space between the first and second layers and to define, at least in part, a finished thickness for the transaction card assembly and bonds the first and second layers together. Expansion of the adhesive foam material may cause one or both of the layers to move and/or may fill a space or void between the layers. Indicia may be attached to the first and second layers and the adhesive foam material. The indicia, such as information representing an account number, biometric data representing a feature of the issuee, etc., may be interacted with in a transaction regarding the transaction card assembly.

In another aspect of the invention, a method for producing a transaction card assembly may include providing a first layer including a sheet of material, applying an adhesive foam onto an inner surface of the first layer, providing a second layer (including a sheet of material) adjacent the adhesive foam so as to sandwich the adhesive foam between the first and second layers, and expanding the adhesive foam between the first and second layers so as to fill a space between the first and second layers and define, at least in part, a finished thickness of the transaction card assembly. Indicia may be associated with the first and second layers and the adhesive foam that is interacted with in a transaction regarding the transaction card assembly.

In one embodiment, the first and second layers may each include a sheet of polymer material having a thickness of less than 0.030 inches, e.g., the first and second layers may be arranged so that the finished thickness of the transaction card assembly is about 0.030 inches. For example, in one embodiment the transaction card assembly may be constructed and arranged to meet ANSI and ISO standards for a CR-80 card, e.g., standards for a typical credit card.

In another embodiment, the transaction card assembly may include a semiconductor device located at least partially between the first and second layers, and include information stored in the semiconductor device, e.g., representing an account associated with the assembly, representing an identity of the issuee, biometric data, security information, and so on. The semiconductor device may be constructed and arranged to receive and/or send radio frequency communications with a device located at a distance from the transaction card assembly. Thus, in one embodiment, the transaction card assembly may be constructed and arranged to function as a smartcard.

Indicia included with an assembly may include one or more of the following: an alphanumeric string formed on the first or second layer; information encoded in a magnetic strip on the first or second layer; a barcode formed on the first or second layer; graphical information printed on the first or second layer; an image of a person formed on the first or second layer; a hologram; a PIN formed on the first or second layer; a removable label adhered to the first or second layer that carries printed alphanumeric text or a symbol; or a credit card security code. Indicia may be "attached" to the assembly by being printed to one or more surfaces of the first or second layer (which may define opposite substantially planar sides of the transaction card assembly), encoded in a magnetic strip, embossed in one or more portions of the assembly, stored in a semiconductor or other data processing device, and so on. The indicia may include a machine-readable feature arranged to be read by a device separate from the transaction card assembly, e.g., such that reading of the machine-readable feature obtains information representing an account associated with the transaction card assembly.

In another embodiment, the first layer and/or the second layer may include a line of weakness arranged to permit separation of two portions of the transaction card assembly at the line of weakness without tools. For example, the assembly may include two portions that define an auxiliary portion and a CR-80 card portion. In one arrangement, the auxiliary portion may include indicia arranged for use in a purchase of goods or services. Thus, the assembly may include one or more gift cards, prepaid phone cards, frequent shopper cards, loyalty cards, credit/debit cards, membership card, coupons, advertisements, etc.

In one aspect of the invention, the adhesive foam may include a polyurethane foam including a reaction product of: at least one isocyanate; at least one isocyanate-reactive component; and water. Optionally, one or more of the following may be included with the adhesive form: blowing agents, surfactants, cross-linking agents, extending agents, pigments, flame retardants, catalysts and fillers. The polyurethane foam may have a free rise density of from about 5 lb/ft$^3$ to about 25 lb/ft$^3$, a reactive cream time of from about 10 seconds to about 120 seconds, and/or an elongation of from about 30% to about 300%.

These and other advantages and benefits afforded by aspects of the invention will be apparent from the description and claims below.

BRIEF DESCRIPTION OF THE DRAWINGS

Aspects of the invention are described below in connection with illustrative embodiments and with reference to the drawings in which like numerals reference like elements, and wherein.

DETAILED DESCRIPTION

It should be understood that aspects of the invention are described with reference to the figures which show illustrative embodiments that incorporate one or more aspects of the invention. The illustrative embodiments described below are not necessarily intended to show all aspects of the invention, but rather are used to describe a few illustrative embodiments. Thus, aspects of the invention are not intended to be construed narrowly in view of the illustrative embodiments.

As discussed above, transaction cards are widely used for a variety of different purposes, such as for credit and debit account purchases, tracking member activity (e.g., tracking frequent flyer activity), for gift-certificate purchases, opening hotel room doors, and so on. In one aspect of the invention, a transaction card assembly may be made to have first and second layers that sandwich an adhesive foam which bonds the first and second layers together. The first and second layers may form opposed outer surfaces of the assembly, may include two or more sub-layers, and/or one or both of the layers may be covered at least partially by other layers. The adhesive may be provided between the layers and expand so as to fill a space between the layers and define the finished thickness of the first and second layer/adhesive assembly. The finished thickness of the first and second layer/adhesive assembly may define the finished thickness of the transaction card assembly (e.g., where the first and second layers define opposed outer surface of the card assembly) or may define a thickness of the second layer/adhesive assembly that is added to (e.g., by adding one or more layers onto the first or second layers). This arrangement is in contrast to some injection molding and other processes in which a pressurized resin is provided between opposed layers and the layers are squeezed together to define the thickness of the assembly. Instead, and in accordance with an aspect of the invention, the adhesive foam itself expands to define the thickness of the product produced.

As with any of the embodiments described herein, the transaction card of a transaction card assembly may be used, for example, as a credit or debit card, a membership identification card, an account identification card, a gift card, a prepaid telephone card, and so on. Aspects of the invention may also be used in the manufacture of other sheet products, such as signs, point-of-sale displays, wallet-size or other calendars, rulers, etc., that are made using a process like that discussed below with respect to transaction card assemblies. Thus, aspects of the invention should not necessarily be limited to transaction cards, but instead may be used with other products.

Figure 1:
FIG. 1 shows a first side of a transaction card assembly in an illustrative embodiment.
Figure 2:
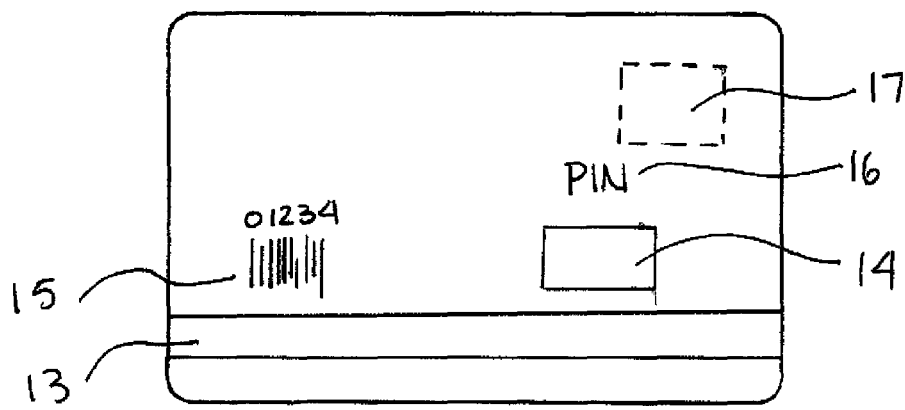
FIG. 2 shows a second side of the FIG. 1 assembly.
Figure 3:
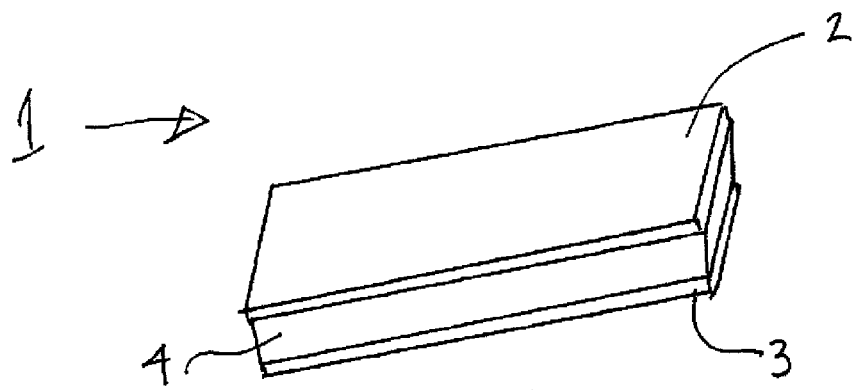
FIG. 3 shows a perspective side view of the FIG. 1 assembly.

FIGS. 1-3 show first and second sides and a perspective side view, respectively, of a transaction card assembly 1 in accordance with an embodiment of the invention. It should be understood that FIGS. 1-3 show only one illustrative embodiment and should not be used to narrowly interpret the scope of the invention. In addition, various aspects of the invention are described below. It should be understood that these various aspects may be used in a variety of different combinations. Therefore, the illustrative embodiments described below are not intended to show all aspects of the invention, but rather are used to describe a few embodiments of the invention.

In this illustrative embodiment, the transaction card assembly 1 includes a transaction card 10 that has a rectangular shape that meets the ANSI and ISO standards of a CR-80 card (e.g., which is about 3.370 inches wide and 2.125 inches high, and has a finished thickness of about 0.030 inches +/−10 percent). Of course, it will be understood that various aspects of the invention may be used with any size, shape, thickness or other configuration of a card and/or other portions of a transaction card assembly.

In other illustrative embodiments, transaction card assemblies formed in accordance with aspects of the invention may have two or more separable parts like that described in U.S. Pat. No. 6,588,658, which is incorporated herein by reference. As also described in U.S. Pat. No. 6,588,658, the cards may be made to meet ANSI and ISO specifications for transaction cards after various card portions are separated from each other without the use of tools. Other features of the transaction cards (and optional auxiliary portions) described in U.S. Pat. No. 6,588,658 may also be used with transaction cards in accordance with aspects of the invention.

The transaction card assembly 1 in this embodiment includes various types of indicia, e.g., image information or other items that are suitable for use in a transaction. The indicia may take any suitable form, such as graphics, logos, trademarks, alphanumeric text, photographic-like images, holograms, polarizing layers, security features (e.g., which may not be visible under normal conditions, but made visible under special illumination or viewing conditions), and so on. Some of the indicia may be formed by printing or otherwise forming image information on the transaction card assembly 1. For example, in this embodiment, the transaction card assembly 1 includes image information "VENDOR NAME" on a first side of the card 10 shown in FIG. 1, which is intended to represent any suitable text, graphics, or other information. Image information on the transaction card assembly 1 may be formed in any suitable way, such as by printing (whether offset, inkjet, screenprint, etc.), lamination, deposition, or other suitable processes. (As used herein, forming image information "on" a layer or sheet of material includes formation of the image information directly on the layer or sheet as well as formation of image information on one or more layers positioned between the image information and the layer or sheet of material.)

Other types of indicia may be provided in other ways. For example, a second side of the card shown in FIG. 2 has indicia including a magnetic strip 13 (which may encode information representing an account associated with the card 10, an issuee's name, address or other information, etc.), a label 14, which may include printed information and may be removable from the card 10, a barcode and/or printed alphanumeric text 15, a personal identification number (PIN) 16 that may be printed and optionally concealed by a scratch-off or other security-enhancing feature (not shown), and an electronic device 17 that may be constructed and arranged to receive and/or send radio frequency (RF) communications with a device located at a distance from the transaction card assembly (e.g., to allow the card 10 to function as a contact or contactless smartcard).

Some types of indicia may include machine readable features, such as the encoded magnetic strip 13, a bar code 15, an embossing (not shown), a passive radio frequency identification (RFID) tag 17 or other passive device, and so on. These machine readable features may be formed in any suitable way, such as in a "personalization" process by which a magnetic strip is encoded with a unique identifier, a unique bar code is printed on the cards, a unique string of alphanumeric text is printed on the card (e.g., by inkjet printing, thermal printing, embossing, etc.), and so on. The transaction card 10 may also include more active devices, such as an active radio frequency identification (RFID) chip or other semiconductor device 17, such as those found in electronic cash cards or "smartcards" like that described in U.S. Pat. No. 5,971,282. Thus, the transaction card 10 may include any suitable electronic device capable of providing identification information, receiving and processing information or performing other desired transaction functions. The machine readable features may be used to store, obtain, transmit or otherwise handle any type of information, such as text, biometrics information (such as eyescan or fingerprint information) and so on. Such machine readable features may be provided at any point in the card manufacturing process, e.g., may be incorporated into the assembly 1 before image information is formed, formed on individual cards after the cards are cut from a larger piece of material (such as part of a "personalization" process), formed during the image formation process, and so on.

The above are merely examples of the sort of indicia that might be included with a transaction card assembly 1, and other types will occur to those of skill in the art, such as holograms, security inks, biometric data (whether stored electronically or presented in machine-readable or other visible form), a changeable visual display (such as an LCD, electric paper-type or other multi-stable display, etc.), and so on. FIG. 3 shows a perspective side view of the transaction card assembly 1. In accordance with an aspect of the invention, the assembly 1 includes a first layer 2 and a second layer 3 that are bonded together by an adhesive foam material 4, such as a polyurethane foam described in detail below. The first and second layers 2, 3 may take any suitable arrangement, such as each including only a single sheet of material (e.g., an ABS, PET, PVC, polycarbonate (PC) or polylactic acid (PLA) material, or any suitable combination of materials). Alternately, the first and/or second layer 2, 3 may include two or more layers of the same or different material whether in a laminate form or other arrangement. For example, the first layer 2 may include a sheet of PVC or PET material (e.g., having a thickness of 0.005 in. to 0.010 in.) that has a primer coating on one side to help bond printed ink to the sheet, a layer of printed ink (e.g., forming graphics, text or other image information), and a clear protective layer (such as an overlaminate film of PVC or liquid coating that is cured or otherwise processed to provide some protection for the ink layer against abrasion, etc.) The second layer 3 may be formed similarly to the first layer 2, or may have a different arrangement. Note that the first and second layers 2, 3 need not be completely assembled prior to being bonded together by the adhesive foam 4. Instead, the layers 2, 3 may be partially formed, bonded by the adhesive foam 4, and then further assembled. For example, sheets of PVC material may be bonded together by the adhesive foam 4, and thereafter, the sheets may receive a layer of ink printing, an overlaminate film, a hologram, a magnetic strip, one or more layers of polymer or other material (which may be joined to the sheet of PVC material using the adhesive foam 4 or other adhesive, thermal bonding, or other suitable technique), a semiconductor device, and so on to complete the formation of the first and second layers 2, 3. The layers 2, 3 (or components of the layers) may be continuous as shown, or may include holes, openings or recesses (e.g., to receive a portion of an electronic device), may include two or more separate parts that are bonded by the adhesive 4, etc. In another embodiment, the first and second layers 2, 3 may be bonded together by an adhesive foam 4, and the first and second layer/adhesive assembly may be joined with other components, such as being bonded to one or more additional sheets or layers (e.g., lenticular lenses or other optical structures) that are laminated over the first or second layers 2, 3, and so on. For example, an overlaminate may be provided over the first and/or second layers 2, 3 that includes printed image information on an inner side that is secured to the first or second layer 2, 3. Thus, printed information may be provided on a separate layer that is attached to the first and/or second layers 2, 3, if desired.

To assemble the first and second layers 2, 3, the adhesive foam 4 material may be applied to one side (i.e., an inner side) of either or both of the first and second layers 2, 3. Application of the adhesive foam 4 to one or both of the layers 2, 3 may be performed in any suitable way, such as spraying, pouring, brushing, roller application, injection, etc. of the adhesive foam 4 in a generally liquid or flowable form. With the adhesive foam 4 applied to at least one of the layers 2, 3, the layers 2, 3 may be positioned to sandwich the adhesive foam 4 between the layers 2, 3. Thus, sheets of material for the layers 2, 3 may be positioned relative to each other so that the sheets are generally located in parallel planes and are spaced apart by the adhesive foam 4. In accordance with an aspect of the invention, the adhesive foam 4 may expand or otherwise fill a space between the layers 2, 3. In one embodiment, the layers 2, 3 may be moved apart by the adhesive foam 4 to a point where a finished thickness for the transaction card assembly 1 is achieved where the layers 2, 3 will not receive additional components that add to the thickness of the transaction card assembly 1. Where one or both layers 2, 3 receive additional components that add to the thickness of the layer/adhesive assembly, the adhesive 4 will contribute in part to the finished thickness of the transaction card assembly 1 in that the adhesive defines the finished thickness of the layer 2, 3/adhesive 4 assembly. Thereafter, the adhesive foam 4 may cure or otherwise harden so as to become dimensionally stable, thereby bonding the first and second layers 2, 3 together and resisting change in the thickness dimension of the assembly. In one illustrative embodiment in which the first and second layers 2, 3 each have a thickness of about 0.010 inches, the adhesive foam 4 may have a thickness of about 0.010 inches after cure so as to define a finished thickness of the assembly of about 0.030 inches (i.e., the thickness of an ISO specification CR-80 transaction card). Of course, other thickness arrangements are possible.

To establish the finished thickness of the layer 2, 3/adhesive 4 assembly, the first and second layers 2, 3 and sandwiched adhesive foam 4 in an uncured state may be placed between two surfaces having a fixed spacing between them. For example, the first and second layers 2, 3 and uncured adhesive 4 may be positioned between two parallel platens that have a fixed spacing between them, may be positioned between opposite faces of a mold, or other arrangement. The two surfaces may help restrain movement of the first and second layers 2, 3 if they are moved apart by the adhesive foam 4 (e.g., by expansion of the foam). Such an approach can be very effective in the control of thickness in the transaction card assemblies 1, since the adhesive foam 4 will move the layers 2, 3 (or otherwise expand to fill a space between the layers 2, 3) only to a point where they are in contact with the thickness-defining surfaces. Thereafter, the adhesive foam 4 will cure to stabilize the final thickness of the assembly 1. In another illustrative embodiment, the first and second layers 2, 3/adhesive 4 assembly may be provided between one or more pairs of nip rollers or other devices that define a thickness of the assembly during cure of the adhesive 4. Other arrangements will occur to those of skill in the art.

As one example manufacturing process, a sheet of material, e.g., a sheet of PVC that forms or is part of a first layer 2, may be provided and placed on a first surface of a mold. The sheet of material may be relatively large, e.g., suitably sized so that two, ten, 50 or even more transaction card assemblies 1 may be ultimately cut from the sheet, and may have a thickness of 0.010 inches or less. The sheet of material may carry image information, such as printed graphics and/or text, or any other indicia as desired on an outer surface. (Alternately, indicia may be added later.) The outer surface may be placed into contact with the first surface of the mold, e.g., facing downwardly, exposing an inner surface of the sheet of material. An adhesive foam 4 may be sprayed onto the exposed surface of the sheet of material, e.g., to cover the entire exposed inner surface of the sheet of material. Alternately, the adhesive foam 4 may be applied so as to leave voids or other areas where the sheet of material is uncovered by adhesive 4. Areas near the periphery of the sheet of material may be left uncovered by adhesive. This may provide space for expanding adhesive foam 4 to move into. In addition, the first layer 2 may include openings or other pathways to allow expanding adhesive foam 4 an area to move into. If components, such as semiconductor devices, antennas, contact leads, etc., are to be provided for the transaction card assemblies, those components may be positioned in/on the first layer 2 so as to be encapsulated by the adhesive foam 4 or otherwise secured to the transaction card assemblies 1. Alternately, such components may be mounted in/on the second layer 3, or placed directly into the adhesive foam 4 (e.g., an inlay, circuit board or other arrangement carrying a semiconductor device may be placed between the first and second layers 2, 3 and surrounded by the adhesive foam 4), unless they are added after adhesive bonding is complete.

With adhesive foam 4 applied to the inner surface of the first layer 2, a sheet of material that forms or is part of the second layer 3 may be placed over the adhesive 4. Like the first layer 2, the sheet of material for the second layer 3 may be relatively large, or otherwise shaped and sized similarly to (or differently from) the first layer 2. The second layer 3 may be placed directly onto the adhesive 4 or may be associated with an second (upper) surface of the mold. For example, the second layer 3 may be held in place on the second surface of the mold by a vacuum arrangement, clamps or other, which may also be done with the first layer 2. Thereafter, the mold may be closed, i.e., the first and second mold surfaces brought together so that the first and second mold surfaces are spaced a desired distance apart. In one embodiment, the distance between the first and second mold surfaces may be equal to the finished thickness of the transaction card assembly(ies) (or the layer 2, 3/adhesive 4 assembly) made from the first and second layers 2, 3 and the adhesive 4.

With the mold surfaces in place, the adhesive foam 4 may expand or otherwise move to define the spacing between the first and second layers 2, 3 from each other in the finished product. In an arrangement where the first and second layers 2, 3 are fixed to the first and second mold surfaces, the adhesive 4 may expand to fill a space between the layers, and contact and press against the inner surfaces of the first and second layers 2, 3. In an arrangement where one or both of the layers 2, 3 are free to move in the mold, the adhesive 4 may actually move the layers 2, 3 apart from each other until both are in contact with the mold surfaces. The adhesive 4 may then cure (either while in the mold, outside of the mold, or a combination of the two) so as to define a finished thickness of the assembly(ies). Thereafter, one or more transaction card assemblies 1 may be cut (e.g., die cut) from the assembled first and second layers 2, 3 and adhesive 4, in a way similar to that currently done in the art. Prior to, or after cutting of assemblies 1 from larger sheets (if necessary), indicia may be provided for the assemblies. For example, magnetic strip material may be applied to the first or second layers 2, e.g., by a thermal lamination process, indicia may be printed on the first or second layer 2, 3, an overlaminate film or layer may be applied to the first or second layer 2, 3, labels 14 for a plurality of transaction card assemblies 1 may be applied to the sheet and information printed the labels (if the information is not included on the labels before the labels are applied), and so on. The cards 10 may then be subjected to additional processing, if desired, such as encoding, sorting, packaging, personalization and/or quality control operations, as is known in the art. Typically, personalization (e.g., including encoding of magnetic strips, printing of barcodes or alphanumeric text, or formation of other indicia) occurs after transaction card assemblies are cut from a larger sheet.

Figure 4:
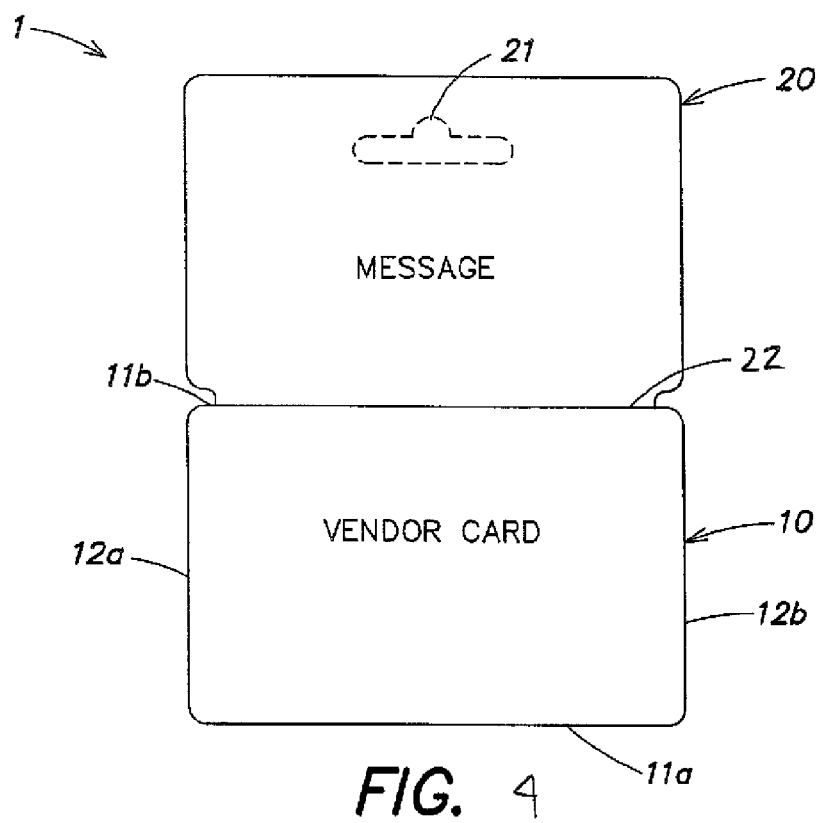
FIG. 4 shows a first side of a transaction card assembly in another illustrative embodiment.
Figure 5:
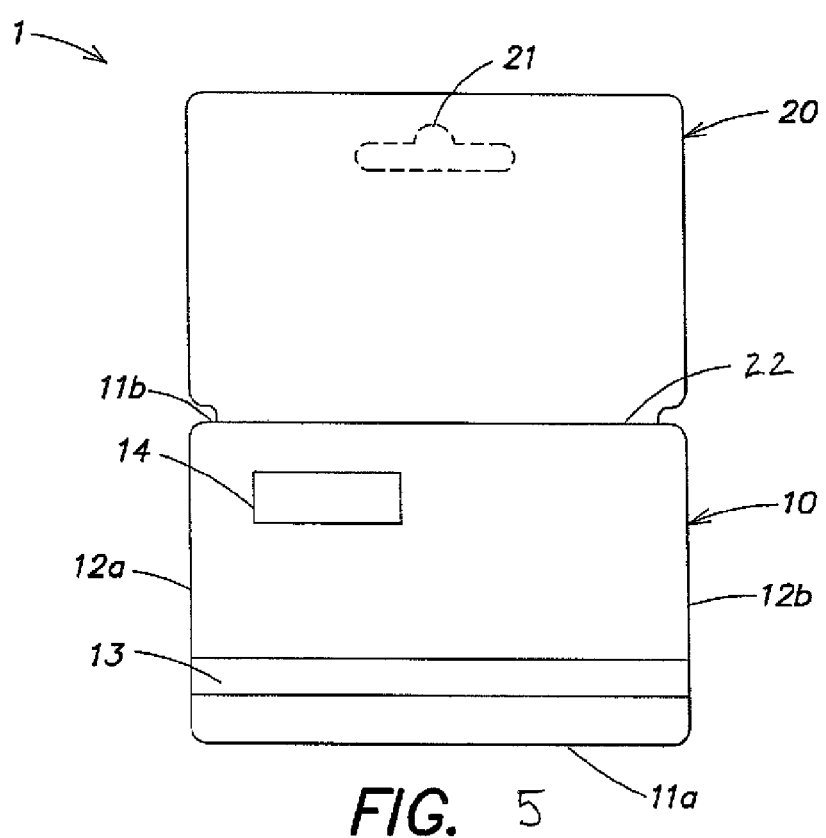
FIG. 5 shows a second side of the FIG. 4 assembly.

FIGS. 4 and 5 show front and back views of another embodiment of a transaction card assembly 1 in accordance with aspects of the invention. The transaction card assembly 1 shown in FIG. 4 includes a transaction card 10 and an auxiliary member 20 attached to the transaction card 10. The transaction card 10 may be used, for example, as a credit or debit card, a membership identification card, an account identification card, a gift card, a prepaid telephone card, and so on. The auxiliary member 20 may also be used as a transaction card, but may alternately include any printed or otherwise presented material, such as advertising, handwritten information, a coupon or other purchase rebate information, a keytag, and so on.

The transaction card 10 and the auxiliary member 20 may be formed as discussed above, e.g., including first and second sheets 2 and 3 of any suitable material that are bonded together by an adhesive foam 4. If the transaction card 10 is intended to meet ANSI and ISO specifications, at least the transaction card 10 may have a finished thickness of 0.030 inches±ten percent. However, ANSI and ISO specifications for transaction cards typically change over time, and therefore the transaction card 10 may be made of any suitable material, have any suitable dimensions or have any other feature to meet with desired ANSI and ISO specifications for transaction cards.

The auxiliary member 20 may be formed of the same material as the transaction card 10 and be attached to the transaction card 10 along a long edge 11 of the transaction card 10. For example, the transaction card 10 and the auxiliary member 20 may be stamped or die cut from a larger assembly of first and second layers 2 and 3 and adhesive 4. A line of weakness 22, which may include perforations, scoring, or other features, may be formed between the transaction card 10 and the auxiliary member 20. Using the line of weakness 22, the transaction card 10 and the auxiliary member 20 may be separated from each other by hand and without tools, e.g., by folding the auxiliary member 20 toward the transaction card 10 along the line of weakness 22, or by tearing along the line of weakness 22. The line of weakness 22 may be formed to allow separation of the auxiliary member 20 from the transaction card 10 so that at least the transaction card 10 edge where the auxiliary member 20 was attached has a smooth edge after separation. The line of weakness 22 is not a required feature, since the transaction card 10 and the auxiliary member 20 may be separated, if desired, by cutting the transaction card 10 and the auxiliary member 20 apart, e.g., using a scissor, shear or other suitable device or method.

In an alternative embodiment, the transaction card 10 and the auxiliary member 20 may be formed separately, and may be formed of different materials. The transaction card 10 and the auxiliary member 20 may then be brought together in an edge-to-edge relationship and connected together, e.g., along mating edges positioned similar to that shown for the line of weakness 22 in FIG. 4. The transaction card 10 and the auxiliary member 20 may be joined together at the edges by any suitable means, such as thermal welding, an adhesive, a mechanical fastener, a coupling device (e.g., a coupling having opposed channels into which the edges of the transaction card 10 and the auxiliary member 20 are inserted and held by the channels) and so on. In addition, the transaction card 10 and the auxiliary member 20 need not be joined in an edge-to-edge relationship. Instead, the auxiliary member 20 may overlap a portion of the transaction card 10 and be joined to the transaction card 10 at the overlap. The auxiliary member 20 may also be overlapped and attached to the transaction card 10 so that information or other features on the transaction card 10 are obscured from view until the transaction card 10 and auxiliary member 20 are separated. For example, the transaction card 10 may be a prepaid phone card having a personal identification number (PIN) or other character sequence that is used to obtain prepaid telephone services. The auxiliary member 20 may be attached to the transaction card 10 so that the PIN or other sequence is obscured from view so that it cannot be viewed (at least without detection) until after the phone card is activated at the time of purchase. In this alternative embodiment, the auxiliary member 20 may be separated from the transaction card 10 by bending the auxiliary member 20 relative to the transaction card 10, thereby causing an adhesive used to join the transaction card 10 and the auxiliary member 20 together to fail. As with the other examples described above, the auxiliary member 20 may be separated from the transaction card 10 by other means, such as by cutting, applying heat to the joint, and so on.

In the illustrative embodiment shown in FIG. 4, the auxiliary member 20 is attached to the transaction card 10 along a long edge 11b of the transaction card 10. However, the auxiliary member 20 may be attached to any one of the edges 11a, 11b, 12a and 12b, or a combination of edges, such as edges 12a and 11b, if desired. Although the transaction card 10 and the auxiliary member 20 are shown in FIG. 4 as having an approximately rectangular shape, the transaction card 10 and/or the auxiliary member 20 may have any suitable shape, such as any polygon, circle, oval, and so on. Further, the auxiliary member 20 need not have the same shape or size as the transaction card 10 and the transaction card assembly 1 may have several different, separable portions.

The transaction card 10 and/or the auxiliary member 20 may include any printed matter or otherwise display any suitable information, such as an advertisement, a credit card number, a message, an account number, a PIN number, one or more labels adhered to the transaction card 10 or the auxiliary member 20 that include information or cover information on the transaction card 10 or the auxiliary member 20, and so on. In this illustrated embodiment, the auxiliary member 20 includes the text "Message" and the transaction card 10 includes the text "Vendor Card" which are used to represent any suitable text, graphic or other information presentation. The transaction card 10 and/or the auxiliary member 20 may also include other features. For example, the auxiliary member 20 may include a hole 21 formed through the auxiliary member 20. This hole 21 may be used to hang or otherwise secure the transaction card assembly 1, the transaction card 10 and/or the auxiliary member 20 to a hook, key chain or other support. The transaction card 10 and/or the auxiliary member 20 may also include other similar features, such as a clip, pin or other fastener. As one example, the auxiliary member 20 (or card 10) may be provided with a clip to attach the auxiliary member 20 to a garment. The auxiliary member 20 may be printed with information, such as an individual's name and photo identification so that the individual may wear the auxiliary member 20 as a security badge. The transaction card 10 may be detached from the auxiliary member 20 and used, for example, as a pass key. Alternately, the transaction card 10 may be removed by security personnel when the individual passes a security checkpoint. Thus, the transaction card 10 in this example may be used as a form of ticket to gain admission to a particular area.

As another example, the transaction card assembly 1 may be used as part of a transaction tracking system. For example, the transaction card 10 may be used as a gift card to purchase items at a retail outlet. Retailers selling the gift card may use the auxiliary member 20 to advertise the gift card, provide a place for a written message to be placed by the giver of the gift card, and so on. A hole 21 in the auxiliary member 20 may be used to hang the assembly 1 from a hook or other display device.

FIG. 5 shows a second side of the transaction card assembly of FIG. 4. As with the first side of the transaction card assembly 1 shown in FIG. 4, the second side of the transaction card assembly 1 may include any suitable printed or otherwise displayed information. Thus, text or graphics information may be printed directly onto, physically stamped into, adhered to, or otherwise placed, e.g., by a label 14, on the transaction card 10 and/or the auxiliary member 20. The transaction card 10 or the auxiliary member 20 may also include one or more machine readable features either of the same type or of different types, e.g., two magnetic strips, a magnetic strip and a bar code, etc. Further, the machine readable features, like any other information on the transaction card 10 and/or the auxiliary member 20 may be placed on any suitable side or location of the card 10 or the auxiliary member 20 (e.g., at least partially between the first and second layers 2 and 3).

As discussed above, one or more labels 14 may be attached to the transaction card 10 and/or the auxiliary member 20. A label 14 may be attached so that the label 14 is removable and reusable, e.g., can be removed and adhered again to the transaction card 10 and/or the auxiliary member 20 or to another surface, so that the label 14 is removable but cannot be reattached to any surface, or so that the label 14 is not removable (without damaging the label 14). The label 14 may include any information, e.g., that is printed on the label 14, and/or the label 14 may obscure information on the transaction card 10 and/or the auxiliary member 20 from view. For example, the label 14 may obscure a PIN number on the transaction card 10 that is used to obtain prepaid telephone services and not be removable without detection. Thus, the account associated with the transaction card 10 may be activated, e.g., at the time of purchase, and the label 14 removed to reveal the PIN number to the purchaser. The label 14 may also include a machine readable feature, such as a magnetic strip 13, that is adhered to the transaction card 10 and/or the auxiliary member 20.

Figure 6:
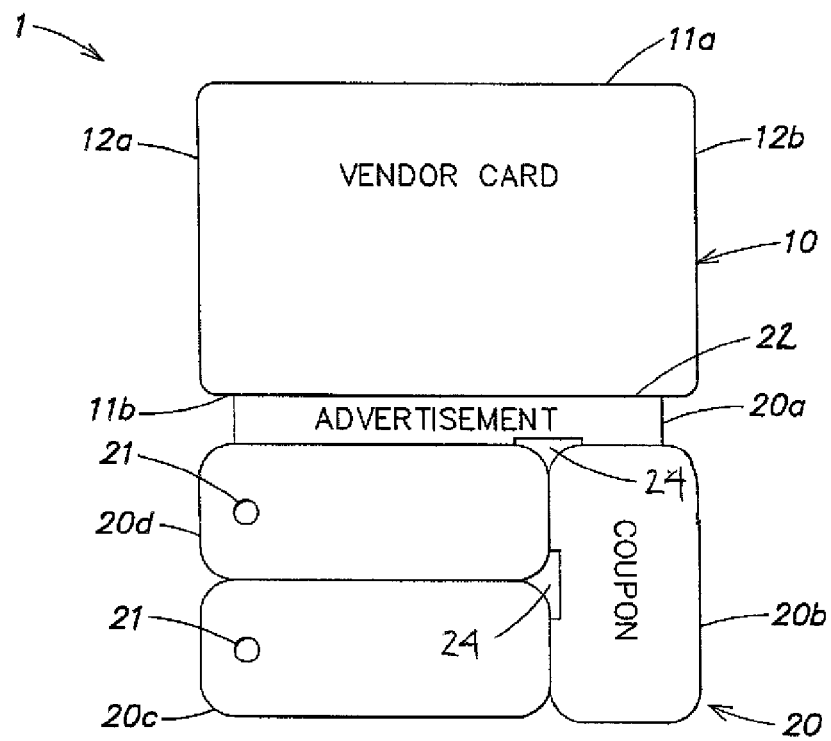
FIG. 6 shows a first side of a transaction card assembly in yet another illustrative embodiment.
Figure 7:
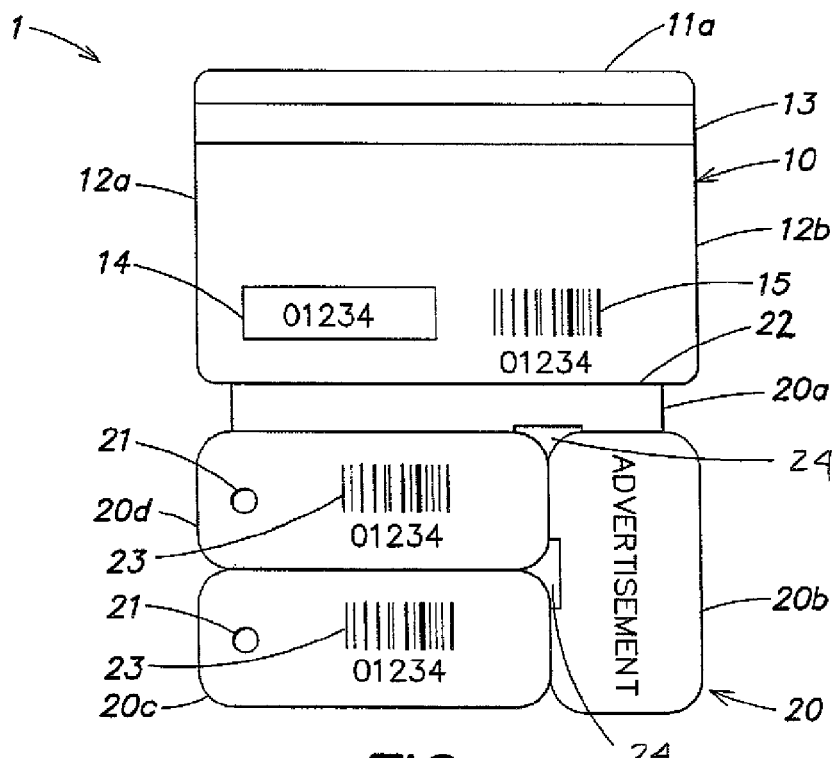
FIG. 7 shows a second side of the FIG. 6 assembly.

FIGS. 6 and 7 show first and second sides, respectively, of another illustrative embodiment of a transaction card assembly 1. In this embodiment, an auxiliary member 20 includes four different sections that are attached to the transaction card 10. In this embodiment, the auxiliary member 20 includes an advertisement section 20a, a coupon section 20b, and two key tags 20c and 20d. Although functional names have been provided for each of the sections 20a-20d of the auxiliary member 20 in this embodiment, these names have been used for ease of reference and understanding, but should not be construed as limiting the possible functions to be performed by or other features to be included in any of the sections 20a-20d.

In this embodiment, the transaction card 10 and the auxiliary member 20 are formed from an assembly of first and second layers 2, 3 and adhesive foam 4 that is die cut to define the outer periphery of the transaction card 10 and auxiliary member 20, as well as optional holes 21 in the key tags 20*c* and 20*d* and/or holes 24 that help define the shape of the key tags 20*c* and 20*d*. The holes 21 and 24 are not required. The die cut process may also include a scoring and/or perforating function to form the line of weakness 22 that separates the auxiliary member 20 and the transaction card 10. Lines of weakness 22 may also be formed between the portions 20*a*-20*d* of the auxiliary member 20. However, as discussed above, the various portions of the transaction card assembly 1 may be separately formed and then joined together in any suitable way. For example, the transaction card 10 and the auxiliary member 20 may be separately formed and then joined in an edge-to-edge fashion by an adhesive, thermal welding or other suitable process.

As with the other examples described above, the transaction card 10 and any of the portions 20*a*-20*d* of the auxiliary member 20 may include any type of printed information, such as advertisements, coupon or other purchase rebate information, a vendor name, and so on, or no information at all. In short, the invention is not limited in the way that information is presented or the type of information presented on any portion of the transaction card assembly 1.

FIG. 7 shows a second side of the transaction card assembly 1 shown in FIG. 6. In this embodiment, the transaction card 10 includes machine-readable features such as a magnetic strip 13 and a barcode 15. As with the other examples described above, the magnetic strip 13 may be formed on the transaction card 10 in any suitable way, such as by a heat lamination or other suitable process. The transaction card 10, including the magnetic strip 13, the barcode 15 or other features may be made to meet current or future ANSI and ISO specifications for transaction cards, such as credit cards.

The transaction card 10 and/or any portion 20*a*-20*d* of the auxiliary member 20 may also include one or more labels 14. The labels 14 may be removable or non-removable from the transaction card 10, and may or may not include indicia that match other indicia on the transaction card 10. For example, the label 14 may include an alphanumerical string that matches an alphanumerical string encoded in the barcode 15 and/or the magnetic strip 13. Indicia on the label 14, the magnetic strip 13 and/or the barcode 15 may be unique with respect to transaction card assemblies 1 in a set of assemblies 1. For example, each transaction card assembly 1 may include indicia, such as an account number, that is unique to that transaction card assembly 1. A plurality of transaction card assemblies 1 each having unique indicia may be included in a set of assemblies 1 that are used, for example, as part of a member transaction tracking system, such as a frequent flyer program or grocery store membership program. If the indicia on the label 14 matches indicia on the transaction card 10 (such as the indicia encoded in the barcode 15 and/or the magnetic strip 13), the label 14 may be removed from the transaction card 10 when the transaction card 10 is placed into service. For example, as part of an issuee registration procedure, an issuee may complete a registration form including the issuee's name, address and other suitable information and place the label 14 containing the unique indicia on the registration form. Thus, the issuee or transaction card issuer may be more easily assured that the proper indicia, such as an account number, included on the label 14 and in the barcode 15 or magnetic strip 13 is included in the registration form. This can ensure that the proper issuee information is associated with the account number included in the transaction card 10.

As another example, the label 14 may include a personal identification number (PIN) that is personal to authorized users of the transaction card 10. Thus, an issuee of the transaction card 10 may remove the label 14 containing a PIN and attach the label 14 to a registration form or other document that is kept separate from the transaction card 10.

Although the label 14 is shown as attached to the transaction card 10, one or more labels 14 may be provided on the transaction card 10 and/or any portion 20*a*-20*d* of the auxiliary member 20. In addition, any portion 20*a*-20*d* of the auxiliary member 20 may include any suitable information such as a barcode 23 on the key tags 20*c* and 20*d*. The bar code 23 may match the bar code 15 or other indicia included on the transaction card 10, or may be different. Similarly, the key tags 20*c* and 20*d* (or other portions of the auxiliary member 20) may include one or more labels 14 that correspond to indicia included on the key tags 20*c* and 20*d* (or other portions 20*a* and 20*b*). As one example, a transaction card 10, a key tag 20*c* and a key tag 20*d* may all include different account numbers that are part of a same account. These account numbers may be encoded, for example, in a barcode 15 or 23. The transaction card 10, the key card 20*c* and key card 20*d* may also include a label 14 that includes indicia, such as an alphanumerical string, that matches the indicia included in the barcode 15 or 23. Thus, when the account associated with the transaction card assembly 1 is placed into service, issuee information or other suitable information may be provided on a registration form and each of the labels 14 removed from the transaction card 10, and the key cards 20*c* and 20*d* and placed on the registration form. The labels 14 placed on the registration form may be placed so that they correspond with specific sets of issuee information on the registration form. For example, a first family member may be issued the transaction card 10 and the label 14 is placed on the registration form in association with the first member's information. A second member may be issued the key card 20*c* and a label 14 on the key card 20*c* may be placed on the registration form in association with the second member's information, and so on.

The embodiment shown in FIGS. 6 and 7 is only one example of a transaction card assembly 1. It should be understood that various portions 20*a*-20*d* may be omitted, moved in position relative to other portions 20*a*-20*d*, and so on. For example, the advertisement portion 20*a* may be omitted and the coupon portion 20*b* and the key tag 20*d* may be attached directly to the transaction card 10 along the edge 11*b*. As another example, the coupon section 20*b* may be omitted and the key tags 20*c* and 20*d* made longer. Any of the portions 20*a*-20*d* may also include a machine-readable feature, such as a magnetic strip 13, barcode, electronic chip or other device, and so on.

In the embodiments described above, the magnetic strip 13 is placed near a long edge 11*a* opposite the auxiliary member 20. This placement allows the magnetic strip 13 to extend between the short edges 12*a* and 12*b* of the transaction card 10 and allows easier encoding of the strip 13 while the auxiliary member 20 is attached to the transaction card 10. However, it should be understood that the magnetic strip 13 need not be arranged as shown in FIGS. 12 and 14. Instead, two or more magnetic strips 13 may be included and/or a magnetic strip 13 may extend in any suitable direction along, or on any side of, the transaction card 10 and/or the auxiliary member 20, or portions of the transaction card assembly 1 may have a so-called fill magnetic back. Magnetic strips 13 or any other machine readable feature may be placed on the transaction card 10 and/or the auxiliary member 20 in a position such that the strip 13 or other feature can be read by a machine, such as a magnetic strip reader, without detaching the auxiliary member 20 from the transaction card 10.

The arrangements shown in FIGS. 11-14, and other described or similar arrangements, allow encoding of the magnetic strip 13, application of and/or printing of indicia on the label 14 and/or printing of the bar codes 15 and 23 and/or application of other information on the transaction card assembly 1 in one pass while the transaction card assembly 1 is fully assembled. That is, a transaction card assembly 1 may be formed, e.g., stamped, from a single sheet of plastic either with or without the magnetic strip 13 being previously fixed to the transaction card 10. If the magnetic strip 13 has been previously attached to the sheet of plastic before stamping, the transaction card assembly 1 may be subjected to an encoding process that stores information, such as an account number, an account credit value, and so on, in the magnetic strip 13 and/or an electronic device 17 before the transaction card assembly 1 is cut from the sheet. Of course, the magnetic strip 13 may be attached to the transaction card assembly 1, or the magnetic strip 13 may be encoded, after the assembly 1 is cut from the sheet. Thus, it is not necessary, although possible, to encode the magnetic strip 13 before the auxiliary member 20 is attached to the transaction card 10. Similarly, the labels 14 may be applied and/or printed and the barcodes 15 and 23, advertisements or other features may be applied to the transaction card assembly 1 while the transaction card 10 and the auxiliary member 20 are attached. This allows the transaction card assembly 1 to be completely formed and ready for use without requiring the separate manufacture of the transaction card 10 or any portions of the auxiliary member 20 before assembling the transaction card 10 and portions of the auxiliary member 20 together to form the transaction card assembly 1. However, it should be understood that the transaction card 10 and/or the auxiliary member 20 may be manufactured, in whole or in part, before the transaction card 10 and the auxiliary member 20 are attached to each other. As discussed above, portions of the auxiliary member may be attached directly to the transaction card 10 or attached to the transaction card 10 through an intermediate member, such as the advertisement portion 20a. The auxiliary member 20 may be attached along an edge 11b of the transaction card 10, e.g., in an edge-to-edge fashion by thermal welding, an adhesive, mechanical devices or other suitable means.

Adhesive Foam Details

Equivalent weights and molecular weights given herein in Daltons (Da) are number average equivalent weights and number average molecular weights respectively, unless indicated otherwise.

One aspect of the invention employs an elastomeric polyurethane foam made from the reaction product of at least one isocyanate, at least one isocyanate-reactive component and water, optionally in the presence of at least one of blowing agents, surfactants, cross-linking agents, extending agents, pigments, flame retardants, catalysts and fillers, wherein the elastomeric polyurethane foam has a free rise density of from 5 lb/ft$^3$ to 25 lb/ft$^3$, a reactive cream time of from 10 seconds to 120 seconds, and an elongation of from 30% to 300%.

As discussed above, the polyurethane foam may be used to form an assembly containing a first layer, a second layer and the elastomeric polyurethane foam comprising the reaction product of at least one isocyanate, at least one polyol and water, optionally at least one of blowing agents, surfactants, cross-linking agents, extending agents, pigments, flame retardants, catalysts and fillers. The elastomeric polyurethane foam may be sprayed onto one surface of the first layer and expand to contact and adhere to one surface of the second layer which is oriented parallel to the one surface of the first layer. The elastomeric polyurethane foam may have a free rise density of from 5 lb/ft$^3$ to 25 lb/ft$^3$, a reactive cream time of from 10 seconds to 120 seconds, an elongation of from 30% to 300%, a molded density of from 25 lb/ft$^3$ to 65 lb/ft$^3$ and a peel strength of greater than 2.0 lb/in$^2$. The elastomeric polyurethane foam may contain at least one polyisocyanate. Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4diisocyanate, and mixtures of these isomers; 1-isocyanato-3,3,5-trimelhyl-5isocyanatomethylcyclohexane (isophorone diisocyanate; e.g., German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDT"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI or polymeric MDI, PMDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919, 034 and 2,004,048; modified polyisocyanates containing urea groups of the type described in German Patentschrift 1,230, 778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat No. 3,567,763, and in German Patentschrift 1,231, 688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI or polymeric MI, PHMI); and polyisocyanates containing carbodiimide groups, urethane groups, allophanate groups, isocyanurate groups, urea groups, or biuret groups (modified polyisocyanates).

Isocyanate-terminated prepolymers may also be useful in the preparation of the elastomeric foams of the present invention. Prepolymers may be prepared by reacting an excess of organic polyisocyanate or mixtures thereof with a minor amount of an active hydrogen-containing compound as determined by the well-known Zerewitinoff test, as described by Kohler in Journal of the American Chemical Society, 49, 3181 (1927). These compounds and their methods of preparation are well known to those skilled in the art. The use of any one specific active hydrogen compound is not critical; any such compound can be employed in the practice of the present invention. Preferred isocyanates for use in the present invention include MDI based materials and may either be monomeric, polymeric, or prepolymers.

Although any isocyanate-reactive compound may be used to produce the polyurethanes of the present invention, polyether polyols are preferred as isocyanate-reactive components. Suitable methods for preparing polyether polyols are known and are described, for example, in EP-A 283 148, U.S. Pat. Nos. 3,278,457; 3,427,256; 3,829,505; 4,472,560; 3,278, 458; 3,427,334; 3,941,849; 4,721,818; 3,278,459; 3,427,335; and 4,355,188.

Suitable polyether polyols may be used such as those resulting from the polymerization of a polyhydric alcohol and an alkylene oxide. Examples of such alcohols include ethylene glycol, propylene glycol, trimethylene glycol, 1,2-butanediol, 1,3-butanediol, 1,4-butanediol. 1,2-pentanediol, 1,4-pentanedoil, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, arnylene. oxide, and mixtures of these oxides. Polyoxyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly1,2-oxybutylene and polyoxyethylene glycols and copolymer glycols prepared from blends or sequential addition of two or more alkylene oxides. The polyoxyalkylene polyether polyols may be prepared by any known process.

As catalysts for polyurethane formation, it is possible to use those compounds which accelerate the reaction of the isocyanate with the isocyanate-reactive component. Suitable catalysts for use in aspects of the invention include tertiary amines and/or organometallic compounds. Examples of compounds include the following: triethylenediamine, aminoalkyl- and/or aminophenyl-imidazoles, e.g. 4-chloro-2,5-dimethyl-1-(N-methylaminoethyl)imidazole, 2-aminopropyl-4,5-dimethoxy-1-methylimidazole, 1-aminopropyl-2,4,5tributylimidazole, 1-aminoethyl-4-hexylimidazole, 1-aminobutyl-2,5dimethylimidazole, 1-(3-aminopropyl)-2-ethvl-4-methylimidazole, 1-(3aminopropyl) imidazole and/or 1-(3-aminopropyl)-2-methylimidazole, tin (II) salts of organic carboxylic acids, examples being tin(II) diacetate, tin(II) dioctoate, tin(II) diethylhexoate, and tin(II) dilaurate, and dialkyltin(IV) salts of organic carboxylic acids, examples being dibutyltin diacetate, dibutyltin dilaurate, dibutyltin maleate and dioetyltin diacetate.

The polyurethane forming reaction may take place, if desired, in the presence of auxiliaries and/or additives, such as cell regulators, release agents, pigments, surface-active compounds and/or stabilizers to counter oxidative, thermal or microbial degradation or aging.

The inventive elastomeric polyurethane foam preferably has a peel strength greater than 2 lb/in$^2$ in order to meet the requirements of the final application. The free-rise density of the inventive elastomeric foam is from 5 to 25 lb/ft$^3$, more preferably from 10-20 lb/ft$^3$. The elastomeric polyurethane foam of the present invention preferably has an elongation of from 30 to 300%, more preferably from 75 to 250% and most preferably from 100 to 200%. The elongation of the inventive elastomeric foam may range between any combination of these values, inclusive of the recited values. The elastomeric polyurethane foam preferably has a cream time (the time from initial mixing to change in appearance) of from 10 to 120 seconds, more preferably from 15 to 90 seconds and most preferably from 20 to 60 seconds. The cream time of the inventive elastomeric foam may range between any combination of these values, inclusive of the recited values. The molded density of the inventive elastomeric foam is from 25 to 65 lb/ft$^3$, more preferably from 35 to 65 lb/ft$^3$, and most preferably from 45 to 65 lb/ft$^3$. The molded density of the inventive elastomeric foam my range between any combination of these values, inclusive of the recited values.

As mentioned above, any suitable material may be utilized to form a transaction card assembly or other product. Examples of suitable plastic materials include acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers, KYDEX (an acrylic/PVC alloy), liquid crystal polymer (LCP), polyacetat (POM), polyacrylates, polyacrylonitrile (PAN), polyamide (PA or Nylon), polyamide-imide (PAI), polyaryletherketone (PAEK), polybutadiene (PBD), polybutylene (PB), polybutylene terephthalate (PBT), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherimide (PEB), polyethersulfone (PES), polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC) and polyvinylidene chloride (PVDC).

Preferred plastic materials in some embodiments are acrylonitrile butadiene styrene (ABS), polyvinyl chloride (PVC), polycarbonate (PC), and-polyethylene terephthalate (PET). Standard methods used in the industry for improving adhesion to these plastic materials should preferably be applied when producing the inventive composite. Such methods include, but are not limited to, chemical adhesion promoters, flame treating, plasma treating, and solvent cleansing.

Although the plastic materials useful in the inventive composite may be of any thickness, the materials are preferably from 0.005 in. (0.125 mm) and 0.075 in. (1.9 mm), more preferably from 0.008 in. (0.20 mm) and 0.060 in. (1.5 mm) and most preferably from 0.010 in. (0.25 mm) and 0.040 in. (1.0 mm). The plastic materials in the present invention may have a thickness ranging between any combination of these values, inclusive of the recited values.

EXAMPLES

All quantities given in "parts" and "percents" are understood to be by weight, unless otherwise indicated. By "isocyanate index" is meant the quotient of the number of isocyanate groups divided by the number of isocyanate-reactive groups, multiplied by 100. The following materials were used in producing the semi-rigid polyurethane foams of the examples:

| | |
|---|---|
| POLYOL A | a 4,800-molecular weight polyoxypropylene triol modified with ethylene oxide; having a functionality of about 3, a hydroxyl number of about 35 mg KOH/g; |
| POLYOL B | a glycerin-initiated polyoxyalkylene polyether triol. having a hydroxyl number of 28 mg KOH/g; |
| POLYOL C | a 4,000 molecular weight propylene oxide/ethylene oxide polyether polyol based on PG, (80 wt. % PO/20 wt. % EO end block), having a hydroxyl number of about 28 mg KOH/g and a functionality of about 1.82; |
| CHAIN EXTENDER | ethylene glycol; |
| SURFACTANT | a polyalkylene oxide methyl siloxane copolymer from Momentive Performance Materials as NIAXL-1000; |
| CATALYST A | bis[2-dimethylaminoethyl]ether available from Momentive Performance Materials as NIAX A-1; |
| CATALYST B | triethylene diamine in dipropylene glycol (33/67) available from Air Products & Chemicals as DABCO 33LV; |
| CROSS LINKER | triethanolamine; and |
| ISOCYANATE A | an isocyanate prepolymer having an NCO group content of about 23%, a viscosity of between about 500 and about 800 mPa's at 25° C. and comprising the reaction product of about 86.8% by weight of 4,4'-diphenylmethane diisocyanate having an NCO content of about 33.6%, a functionality of about 2.0 and a viscosity of less than about 25 mPa's at 25° C. and about 13.2% by weight of tripropylene glycol. |

The polyol system and isocyanate were initially combined in the lab to determine initial process information. Reactivity tires and free rise density values were obtained by utilizing a high speed shear mixer to homogenize the components. Thin films of the polymers were produced by squeezing them between two sheets of polyvinyl chloride ("PVC") card material in a heated press.

After the polymer was cured the PVC was peeled off leaving a sample that could be tested via ASTM D412 for the requisite tensile properties.

Composite test samples were produced to test for adhesion, flexibility, and surface appearance. The polyurethane encapsulating material was hand mixed and poured onto the first plastic layer. It was spread manually to cover approximately 50% of the surface. The second plastic layer was placed on top of the first. This composite assembly was placed in a heated press whose gap was maintained at the desired final part thickness. After sufficient curing time the composite was removed and allowed to cool before destructive testing was performed on it. Instrumented adhesion testing was performed on samples according to specifications currently in use in the credit card industry.

TABLE I

| | Ex. 1 | Ex. 2 | Ex. 3 |
|---|---|---|---|
| Component | | | |
| POLYOL A | 76.0 | 38.0 | 53.65 |
| POLYOL B | — | 38.0 | — |
| POLYOL C | 12.0 | 12.0 | 24.0 |
| CHAIN EXTENDER | 9.90 | 9.8 | 20.0 |
| CROSS LINKER | 0.30 | 0.3 | 0.3 |
| SURFACTANT | 1.0 | 1.0 | 1.0 |
| CATALYST A | 0.15 | 0.15 | 0.15 |
| CATALYST B | 0.50 | 0.50 | 0.50 |
| Water | 0.15 | 0.25 | 0.40 |
| ISOCYANATE A | 77 | 78 | 144 |
| INDEX | 105 | 105 | 105 |
| Physical properties | | | |
| Free Rise Density (lb/ft$^3$) | 25 | 18 | 15 |
| Molded Density (lb/ft$^3$) | 58 | 50 | 50 |
| Tensile Strength (lb/in$^2$) | 1450 | 1100 | 1650 |
| Elongation (%) | 150 | 250 | 75 |

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A transaction card assembly constructed and arranged for use in a transaction by an issuee of the transaction card assembly, comprising:
    a first layer including a sheet of material comprising a top surface, a bottom surface and a plurality of peripheral side surfaces, the entirety of at least one of the peripheral side surfaces for the first layer being externally exposed;
    a second layer including a sheet of material comprising a top surface, a bottom surface and a plurality of peripheral side surfaces, the entirety of at least one of the peripheral side surfaces for the second layer being externally exposed;
    a semiconductor device located at least partially between the first and second layers;
    an adhesive foam material between the first and second layers, the adhesive foam material expanding to fill a space between the first and second layers and to define, at least in part, a finished thickness for the transaction card assembly, the adhesive foam material at least partially encapsulating the semiconductor device and bonding the bottom surface of the first layer to the top surface of the second layer; and
    indicia attached to the first and second layers and the adhesive foam material that is interacted with in a transaction regarding the transaction card assembly.

2. The assembly of claim 1, wherein the first and second layers each include a sheet of polymer material having a thickness of less than 0.030 inches.

3. The assembly of claim 2, wherein the finished thickness of the transaction card assembly is about 0.030 inches.

4. The assembly of claim 1, wherein the transaction card assembly is constructed and arranged to meet ANSI and ISO standards for a CR-80 card.

5. The assembly of claim 1 wherein the indicia includes information stored in the semiconductor device.

6. The assembly of claim 5, wherein the semiconductor device is constructed and arranged to receive and/or send radio frequency communications with a device located at a distance from the transaction card assembly.

7. The assembly of claim 5, wherein the transaction card assembly is constructed and arranged to function as a smartcard.

8. The assembly of claim 1, wherein the indicia includes one or more of the following:
an alphanumeric string formed on the first or second layer;
information encoded in a magnetic strip on the first or second layer;
a barcode formed on the first or second layer;
graphical information printed on the first or second layer;
an image of a person formed on the first or second layer;
a hologram;
a PIN formed on the first or second layer;
a removable label adhered to the first or second layer that carries printed alphanumeric text or a symbol; or
a credit card security code.

9. The assembly of claim 1, wherein the first and second layers define opposite substantially planar sides of the transaction card assembly.

10. The assembly of claim 1, wherein the indicia includes a machine-readable feature arranged to be read by a device separate from the transaction card assembly.

11. The assembly of claim 10, wherein reading of the machine-readable feature obtains information representing an account associated with the transaction card assembly.

12. The assembly of claim 1, wherein the first layer and/or the second layer include a line of weakness arranged to permit separation of two portions of the transaction card assembly at the line of weakness without tools.

13. The assembly of claim 1, wherein the two portions of the transaction card assembly include an auxiliary portion and a CR-80 card portion.

14. The assembly of claim 13, wherein the auxiliary portion includes indicia arranged for use in a purchase of goods or services.

15. The assembly of claim 13, wherein the assembly includes a gift card, a prepaid phone card, a frequent shopper card, a loyalty card, a credit/debit card, or a membership card.

16. The assembly of claim 1, wherein the adhesive foam includes a polyurethane foam including a reaction product of:
at least one isocyanate;
at least one isocyanate-reactive component; and
water,
optionally in the presence of at least one of blowing agents, surfactants, cross-linking agents, extending agents, pigments, flame retardants, catalysts and fillers.

17. The assembly of claim 16, wherein the polyurethane foam has a free rise density of from about 5 lb/ft$^3$ to about 25 lb/ft$^3$, a reactive cream time of from about 10 seconds to about 120 seconds, and an elongation of from about 30% to about 300%.

18. The assembly of claim 1, wherein the first and second layers each have a thickness of from about 0.01 in. to about 0.06 in.

19. A method for producing a transaction card assembly constructed and arranged for use in a transaction by an issuee of the transaction card assembly, the method comprising:
providing a first layer including a sheet of material comprising an inner surface, an outer surface and a plurality of side surfaces;
applying an adhesive foam onto the inner surface of the first layer;
providing a second layer adjacent the adhesive foam with the adhesive foam disposed between the first and second layers, the second layer including a sheet of material comprising an inner surface, an outer surface and a plurality of side surfaces;
providing a semiconductor device, the semiconductor device being positioned at least partially between the inner surfaces of the first and second layers;
expanding the adhesive foam between the first and second layers so as to fill a space between the first and second layers and define, at least in part, a finished thickness of the transaction card assembly, the adhesive foam at least partially encapsulating the semiconductor device;
curing the adhesive foam to bond the inner surfaces of the first and second layers together and thereby form a unitary device;
cutting through the first layer, second layer and adhesive layer of the unitary device to yield a transaction card assembly, the entirety of at least one of the peripheral side surfaces for each of the first and second layers being externally exposed; and
providing indicia associated with the first and second layers and the adhesive foam that is interacted with in a transaction regarding the transaction card assembly.

20. The method of claim 19, wherein the first and second layers each include a sheet of polymer material having a thickness of less than 0.030 inches.

21. The method of claim 19, wherein the finished thickness of the transaction card assembly is about 0.030 inches.

22. The method of claim 19, further comprising:
producing a CR-80 card from the assembly of the first and second layers, the adhesive foam and the indicia, wherein the CR-80 card is constructed and arranged to meet ANSI and ISO standards.

23. The method of claim 19 wherein the indicia includes information stored in the semiconductor device.

24. The method of claim 23, wherein the semiconductor device is constructed and arranged to receive and/or send radio frequency communications with a device located at a distance from the transaction card assembly.

25. The method of claim 24, wherein the transaction card assembly is constructed and arranged to function as a smartcard.

26. The method of claim 19, wherein the indicia includes one or more of the following:
an alphanumeric string formed on the first or second layer;
information encoded in a magnetic strip on the first or second layer;
a barcode formed on the first or second layer;
graphical information printed on the first or second layer;
an image of a person formed on the first or second layer;
a hologram;
a PIN formed on the first or second layer;
a removable label adhered to the first or second layer that carries printed alphanumeric text or a symbol; or
a credit card security code.

27. The method of claim 19, wherein the first and second layers define opposite substantially planar sides of the transaction card assembly.

28. The method of claim 19, wherein the indicia includes a machine-readable feature arranged to be read by a device separate from the transaction card assembly.

29. The method of claim 28, wherein reading of the machine-readable feature obtains information representing an account associated with the transaction card assembly.

30. The method of claim 19, wherein the first layer and/or the second layer include a line of weakness arranged to permit separation of two portions of the transaction card assembly at the line of weakness without tools.

31. The method of claim 19, wherein the two portions of the transaction card assembly include an auxiliary portion and a CR-80 card portion.

32. The method of claim 31, wherein the auxiliary portion includes indicia arranged for use in a purchase of goods or services.

33. The method of claim 32, wherein the assembly includes a gift card, a prepaid phone card, a frequent shopper card, a loyalty card, a credit/debit card, or a membership card.

34. The method of claim 19, wherein the adhesive foam includes a polyurethane foam including a reaction product of:
   at least one isocyanate;
   at least one isocyanate-reactive component; and
   water,
   optionally in the presence of at least one of blowing agents, surfactants, cross-linking agents, extending agents, pigments, flame retardants, catalysts and fillers.

35. The method of claim 34, wherein the polyurethane foam has a free rise density of from about 5 lb/ft$^3$ to about 25 lb/ft$^3$, a reactive cream time of from about 10 seconds to about 120 seconds, and an elongation of from about 30% to about 300%.

36. The method of claim 19, wherein the first and second layers each have a thickness of from about 0.01 in. to about 0.06 in.

* * * * *